United States Patent [19]

Baker

[11] Patent Number: 4,658,536
[45] Date of Patent: Apr. 21, 1987

[54] BAIT STATION

[76] Inventor: Rex O. Baker, 1776 Bobbitt Ave., Corona, Calif. 91720

[21] Appl. No.: 766,056

[22] Filed: Aug. 15, 1985

[51] Int. Cl.⁴ .............................................. A01M 25/00
[52] U.S. Cl. ........................................ 43/131; 43/124
[58] Field of Search .................... 43/59, 60, 81, 107, 43/124, 131, 132.1

[56] References Cited

U.S. PATENT DOCUMENTS

| | | | |
|---|---|---|---|
| 982,911 | 1/1911 | Werrick et al. | 43/59 |
| 1,218,406 | 3/1917 | Jackson | 43/81 |
| 1,511,123 | 10/1924 | Hart | 43/81 |
| 1,700,517 | 1/1929 | Ross | 43/121 |
| 2,420,184 | 5/1947 | Mekelburg | 43/131 |
| 2,710,485 | 6/1955 | Starr | 43/131 |
| 2,896,362 | 7/1959 | Wingate | 43/131 |
| 3,298,128 | 1/1967 | Dill et al. | 43/131 |
| 4,303,438 | 9/1983 | West-Harron | 43/81 |
| 4,453,337 | 6/1984 | Williams | 43/81 |

Primary Examiner—M. Jordan
Attorney, Agent, or Firm—Boniard I. Brown

[57] ABSTRACT

The bait station includes an H-shaped passageway with toxicant bait containers located between the arms of the "H" which can be accessed from the central arm by the target animals. Floor baffles and overhead bait deflectors prevent the target animals from entering the bait containers while restricting access to the station by nontarget animals and children.

7 Claims, 16 Drawing Figures

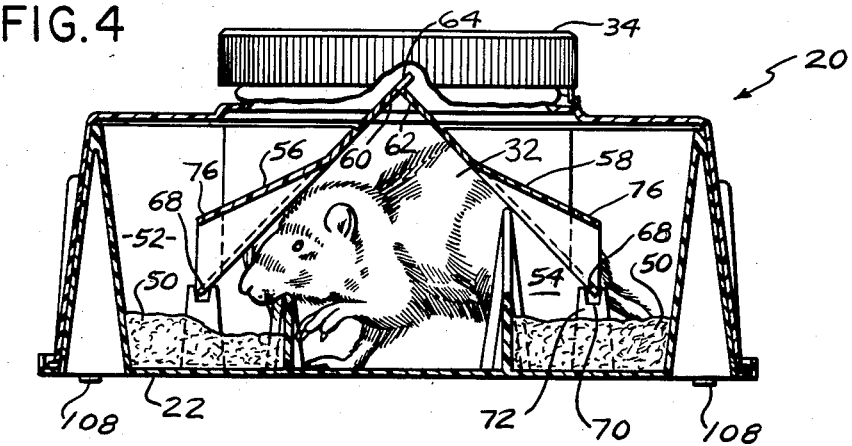
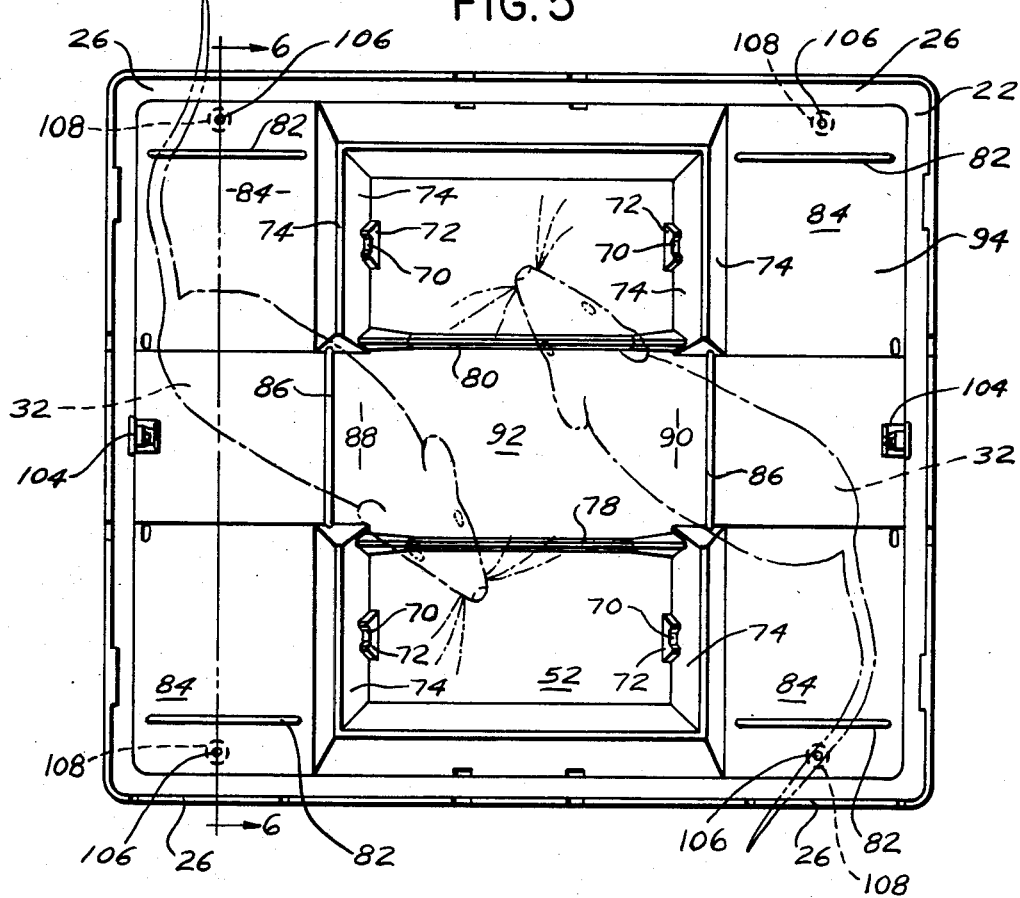
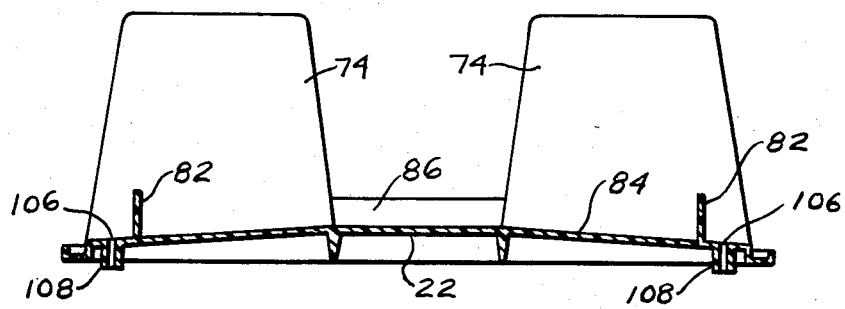

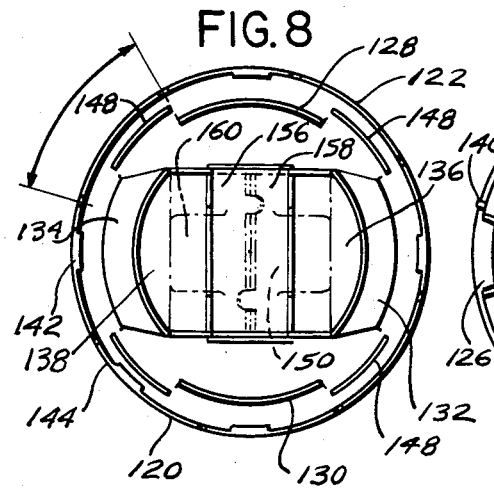
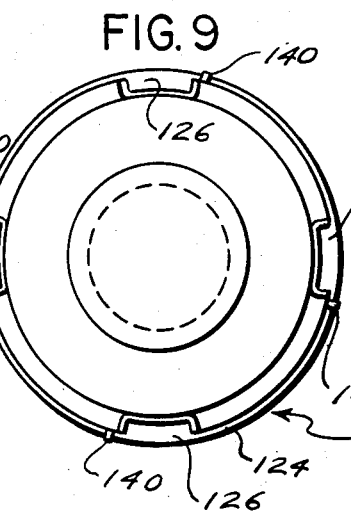
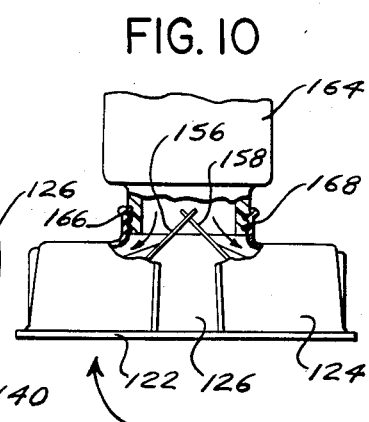
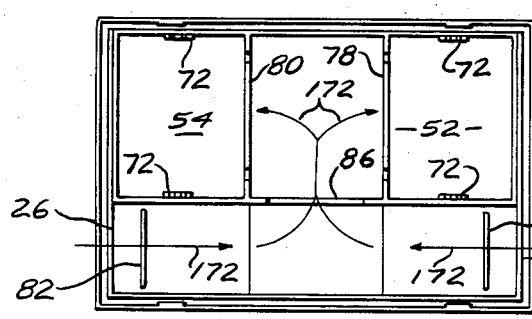
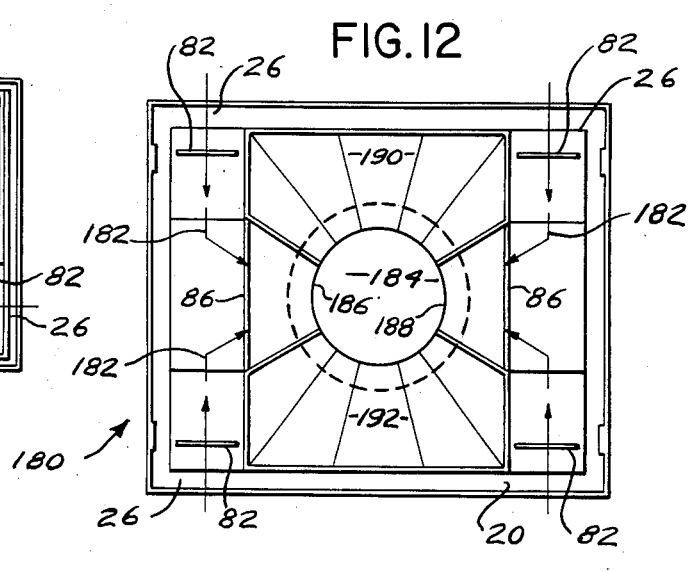
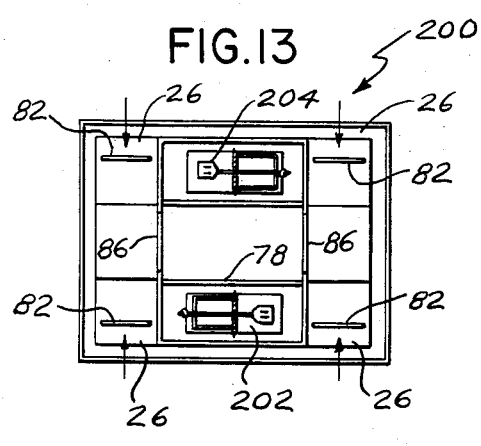
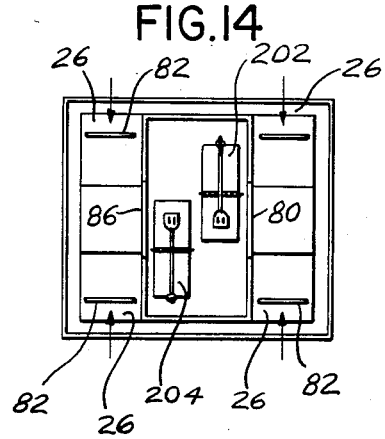
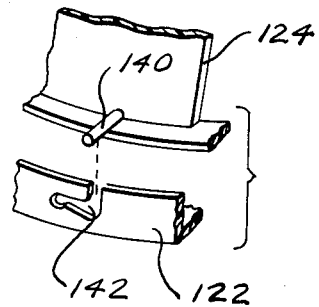

BAIT STATION

BACKGROUND OF THE INVENTION

It long has been recognized that the control of rodents such as rats and mice and similar agricultural pests is highly desirable, since such animals can increase their populations to quickly deplete food supplies meant for humans or other animals. They also spread disease, contaminate the food or directly injure other animals and children. Rats, are extremely cautious of items new in their surroundings consuming strange food in small quantities. Therefore, until the availability of slow acting but lethal toxicant baits, rats were very difficult to poison. The slow acting toxicants are effective because rats apparently cannot connect illness of themselves and others to the food that they are eating until they have consumed a lethal dose. Also, such toxicant bait when eaten makes a rodent thirsty, so that if the rodent is within a structure it will leave in an attempt to find water before drying. This eliminates the problem of odoriferous decay within a structure. However, effective stations must be provided to supply the toxicant bait in an enticing manner without endangering children or larger animals and so that a large number or rodents per bait fill are killed.

To be effective, a bait station must cope with the nature of the pest and the requirements of the toxicant bait. For example, toxicant baits usually require sufficient quantity to provide several days feeding for multiple animals and the station must be large enough to store the bait. Yet rodents have a propensity to get into the bait and excrete upon or otherwise foul it. This makes it unusable for its intended purpose, since later arriving pests may not enter and feed at the fouled bait station. Therefore, the rodents must not be given access to the bait except for feeding.

Mice, generally are inquisitive, but rats hesitate to enter a device which does not provide a visible exit as they enter, and they are most strongly attracted if the visible exit does not disappear as they finally are drawn in by the aroma of the bait to feed. Also the floor of the station should remain dry since most rodents will not enter a wet bait station. Therefore, the station should also be self draining and resistant to wind blown rain if exposed to such conditions.

There is a need therefore, for rodent and similar pesticidal bait stations which provide access and a visible egress for the rodents, and in which the bait containing area is baffled to such a degree that the pest can feed without being able to get into the bait itself. Also, the bait station should be constructed so that entry or access by other than the target pest for whom the station is intended, will be difficult or impossible. It should further be of the nature that the station cannot be entered by children or such that the children cannot reach into the station easily and disturb or obtain the bait. The bait containing portion of the station should be easily recharged and access to the bait recharging area must be locked securely or otherwise closed against the aforesaid children.

Typical patents pertinent to rodent bait stations include Hedrich, et al, Re. No. 14,782; Mayfield, U.S. Pat. No. 2,764,840; Kelly, U.S. Pat. No. 2,944,364; Starr, U.S. Pat. No. 2,977,711; Freeman, U.S. Pat. No. 3,303,600; Anderson, U.S. Pat. No. 3,352,053; Kare, U.S. Pat. No. 3,466,789; Connelly, U.S. Pat. No. 4,182,070; Clark, Sr. U.S. Pat. No. 4,364,194; and Baker, U.S. Pat. No. 4,400,904. The bait station disclosed in Baker has a general "H" configuration so that upon entry to one of the arms of the "H", the rodent can see a way out. However, when the rodent turns down the center arm, its pathway is blocked by the bait container. A visible escape route can not be seen, so the more cautious rats are hesitant about moving to the bait container for feeding. Also, the bait in the Baker station is enclosed in a upstanding tube which provides attraction and leverage for destructive juveniles.

SUMMARY OF THE INVENTION

The present invention considers the problems of the prior art bait stations and provides means to eliminate these problems. Preferably, the present bait station has an "H" configuration with openings at all ends of the "H" arms and bait containing bins located on either side of the center connecting passageway between the "H" arms. This makes access by children or nontarget animals very difficult as two right angle bends must be made in order to gain access to the bait bins. The floor of the present bait station tapers away from the bait bins so that any water that is blown into the structure during a rain storm and not blocked by entrance baffles, tends to drain therepast. This keeps the bait station dry and attractive to rodents. Since, in its preferred embodiment, a rodent can always see the light of an exit, the odor of the bait proves irresistible and the rodent's natural caution is overcome so that it comes back again and again until a lethal dose of bait has been ingested.

The bait station is constructed with two main components, a bottom which defines the "H" passageways and the bait bins, and a top, which covers the structure and provides access for filling, either by removal thereof or by removal of a central lid screwed or otherwise fastened thereto. The top and the bottom of the station are held together by suitable locking means and the station preferably is tied down in position. Internal bait deflectors allow the bait to be poured into a central region for deflection into the bait bins. These bait deflectors also act along with internal baffles to restrict a rodent's movement so that in most instances only the rodent's head can access a bait bin for feeding. This eliminates rodent fouling of the bins. Substitution of a bait bottle with a large supply of bait for the central lid reduces refill requirements in areas where such is safe and desirable.

In some embodiments, one of the arms of the "H" structure is eliminated so that a "T" type construction results in a more compact bait station for small areas. The bait bins may also be eliminated and replaced by traps with are enclosed within the station to prevent access by children or other animals. Trap embodiments normally are used in areas where a dying rodent may not be able to leave a structure and therefore presents an odoriferous nuisance upon demise if it dies in an inaccessible spot.

It is therefore an object of the present invention to provide a toxicant bait station in which the target animal may enter a low profile opening and see an egress when it is attracted to be toxicant bait and after feeding on the bait, leave the station without fouling the bait or spilling or kicking it out of the bait container.

It is another object of the invention to provide a rodent toxicant bait station wherein baffles permit access to the bait by the rodent while allowing drainage of fluids, such as urine or blow in rain water.

It is another object of the invention to provide a rodent trap or bait station wherein only the head of the rodent is permitted access to the bait, and this is done while the light from egress passageways are still visible.

It is another object to provide a bait station which is attractive to the target animals but whose bait cannot be reached by nontarget animals or children.

These and other object and advantages of the present invention will become apparent to those skilled in the art after considering the following detailed specification together with the accompanying drawings wherein:

BRIEF DESCRIPTION OF THE DRAWINGS

FIG. 4 is a side, cross-sectional view taken at line 4—4 in FIG. 2 showing how a rat is restricted in its access to the toxicant bait;

FIG. 5 is a top plan view of the bait station with its cover and bait deflectors removed showing how rats have restricted access to the toxicant bait in bait bins;

FIG. 6 is a side, cross-sectional view taken on line 6—6 of FIG. 5 showing typical entry baffle heights;

FIG. 8 is a top plan view of the lower housing of a modified circular embodiment of the bait station;

FIG. 8A is an enlarged detailed view showing a twist lock feature of the bait station of FIGS. 8 and 9;

FIG. 9 is a top plan view of a cover housing for the lower housing of FIG. 8;

FIG. 10 is a side view, partially in cross-sectional of the embodiment of FIG. 8 having a large bait bottle connected thereto;

FIG. 11 is a modified embodiment of the station of FIGS. 1 through 7;

FIG. 12 is a top view of a lower housing of a modified embodiment with a center feed station and dual bait slides;

FIGS. 13 and 14 are top views of modified embodiments of the station of FIGS. 1 through 7 having traps instead of bait bins.

DETAILED DESCRIPTION OF THE PREFERRED EMBODIMENTS

Figure 1:
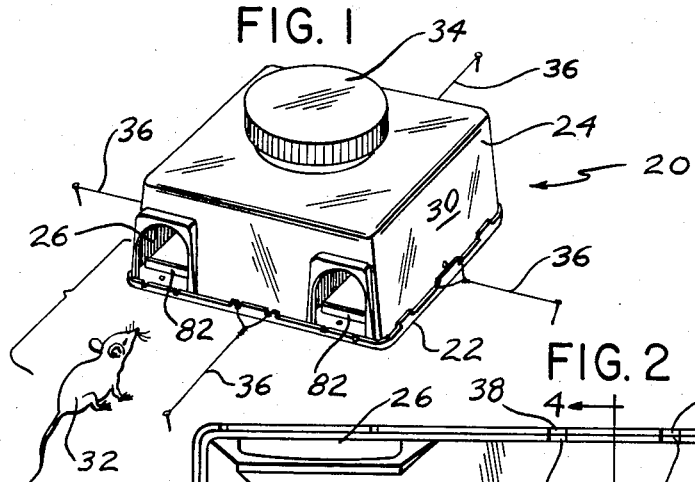
FIG. 1 is a perspective view of a bait station constructed according to the present invention in use attracting a rat.
Figure 2:
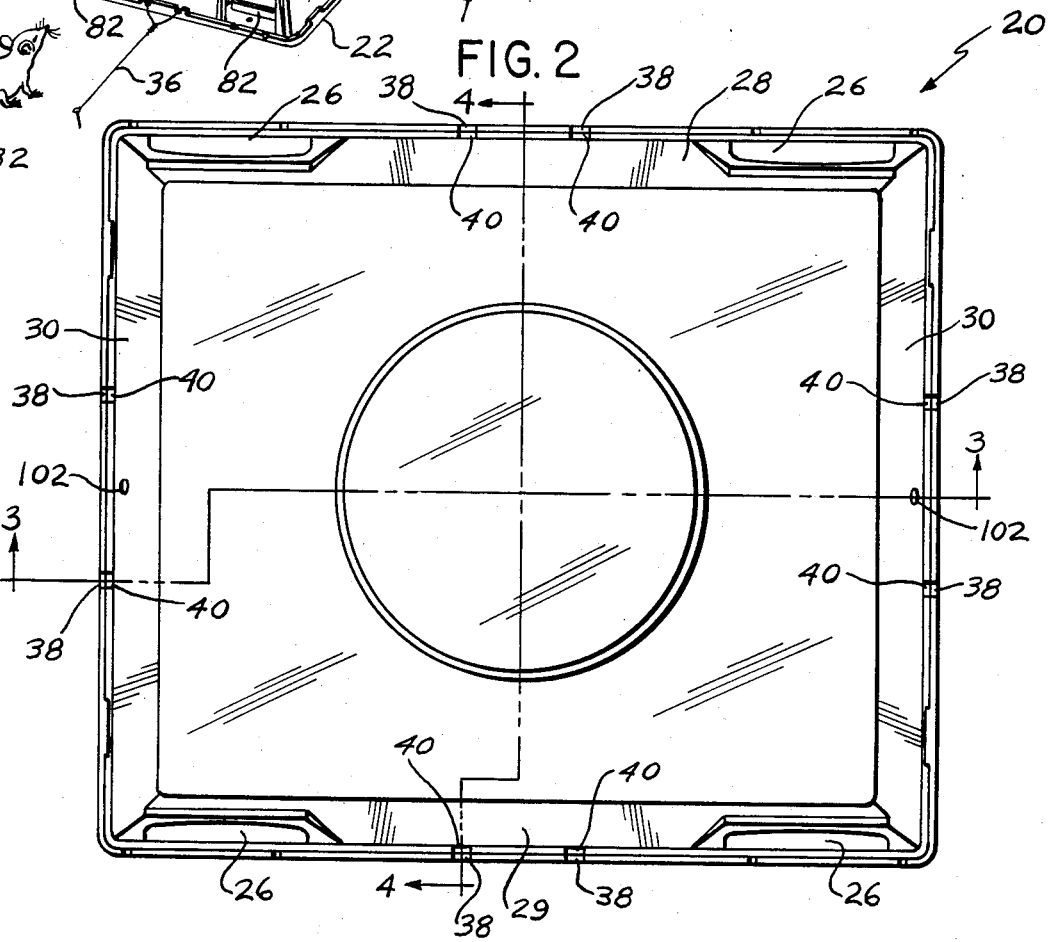
FIG. 2 is a top plan view of the bait station of FIG. 1.

Referring to the drawings more particularly by reference numbers, number 20 in FIG. 1 refers to a bait station constructed according to the present invention. The station 20 includes a base housing 22 mated with a cover housing 24 which includes openings 26 on its opposite side walls 28 and 29 which extend between solid walls 30 and 31. The openings 26 provide access for target animals such as the rat 32, for access to bait placed therein through a screw or snap-on cap 34. The cap 34 is large enough to allow inspection of the interior of the station 20 upon removal. Ties 36 are strung through anchoring tie slots 38 and 40 (FIG. 2) on the base and cover housings 22 and 24 respectively to maintain the staton 20 at its desired location.

Figure 3:
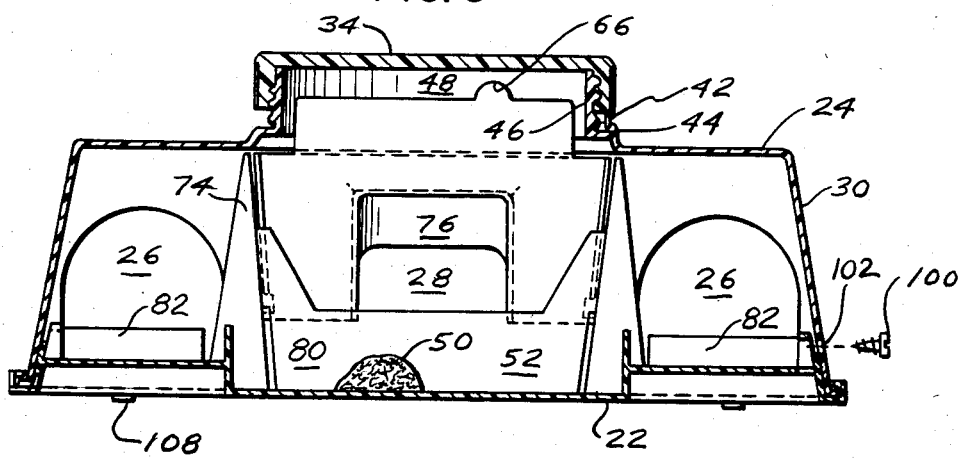
FIG. 3 is a side, cross-sectional view taken on line 3—3 of FIG. 2.

As shown in FIG. 3, the cap 34 can be child proofed by means such as a tab 42 which extends downwardly from the cap 34 to engage with a cam rise 44 adjacent the lip 46 of the fill and inspection opening 48 normally closed by the cap 34. A rat 32, entering through an opening 26 can see the opposite opening 26, as it is being lured toward the bait 50 being positioned in one of two bait bins 52 and 54 (FIG. 4). The bait bins 52 and 54 are shielded from direct view through the opening 48 by a pair of removable deflectors 56 and 58. The deflectors 56 and 58 engage at their uppermost portions 60 and 62 and are interlocked by upstanding tabs 64 and 66. The lower side corners 68 of the deflectors 56 and 58 engage slots 70 in slot members 72 along the side walls 74 of the bait bins 52 and 54. The slots 70 are positioned so that central gables 76 of the deflectors 56 and 58 allow a rat 32 to extend its head over the front side wall 78 or 80 of the bait bin 52 or 54, as shown in FIG. 4. The limited access provided by the gables 76 prevent the rat 32 from climbing into a bin 52 or 54 and spoiling the bait 50 for other rats 32. The rat 32 is further discouraged from climbing into a bin 52 or 54 by the abrupt right angle accesses thereto which occur because of the general "H" configuration of the station 20 as shown in FIG. 5. The entrances 26 are at the ends of the "H" arms.

Figure 7:
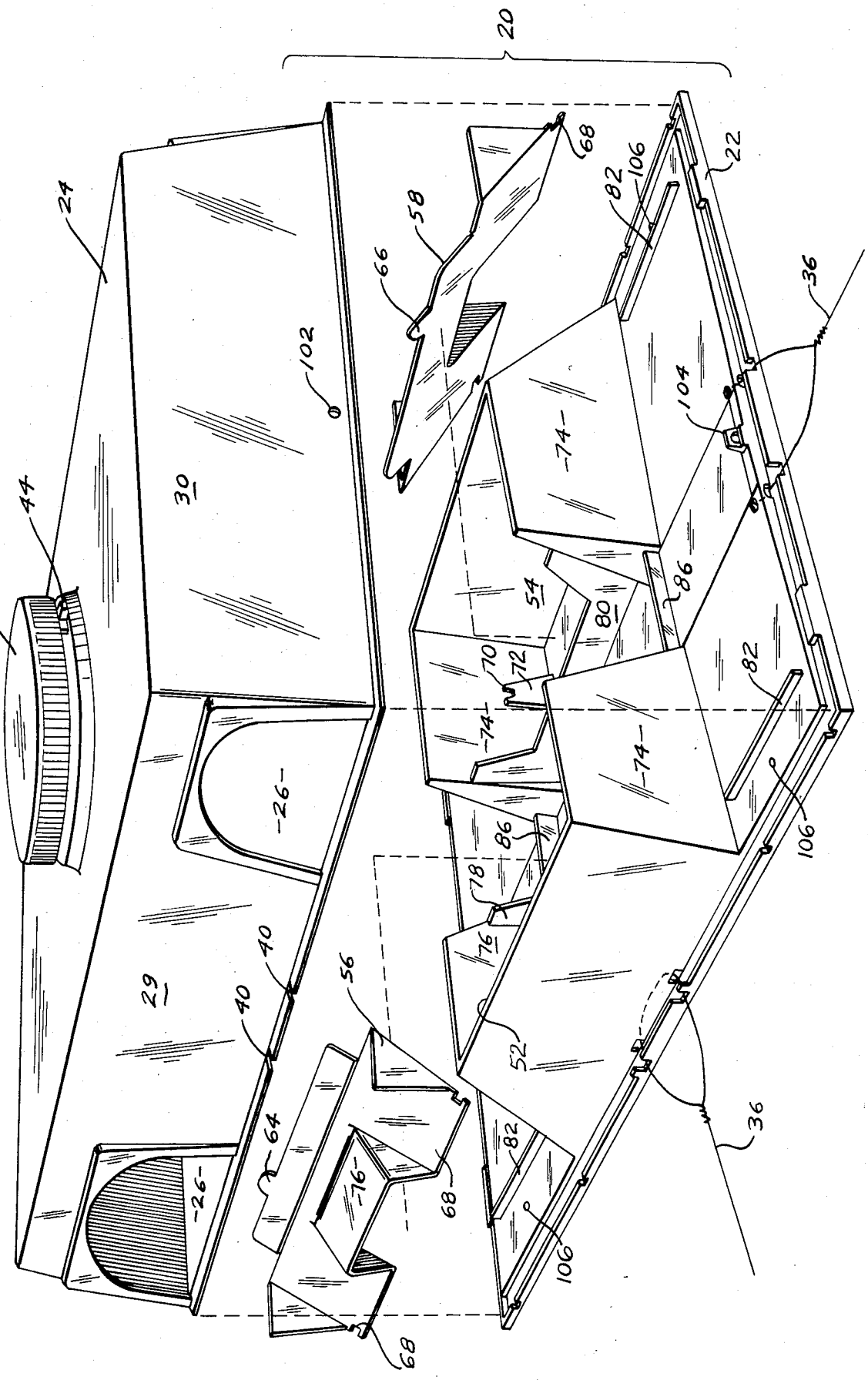
FIG. 7 is an exploded view of the component parts of the bait station of FIGS. 1 through 6.

Entrance baffles 82 are provided at each opening 26 to keep liquids, nontarget animals and children from entering the openings 26. It should be noted that the baffles 82 do not extend completely across the floor 84 of the openings 26. This allows the drainage of fluids which might be blown in in a heavy rainstorm. The floor 84 is canted toward the openings 26 so that this drainage is encouraged. The canting of the floor 84 is shown more clearly in FIGS. 6 and 7. Internal baffles 86 are provided across either end 88 and 90 of the central passageway 92 of the "H" passage system 94. These baffles 86 eliminate the possibility that blown in fluids will, in fact, remain adjacent the bait bins 52 and 54, and also further discourage nontarget animals.

The base housing 22 and cover housing 24 are connected together by suitable means such as fasteners 100 shown in FIG. 3 which pass through securing holes 102 in the cover housing 24 to engage with blind nut structures 104 connected to the base housing 22. Other securing holes 106 formed in studs 108 in the base housing 22 can be used as alternative means to anchor the station 20 in a desired location.

FIGS. 8, 8A, 9 and 10 show details of a circular shaped bait station constructed according to the present invention, which with 45° rotation between the base housing 122 and the cover housing 124 thereof can be closed so that its entry openings 126 are either blocked or opened by two large baffles 128 and 130 and the outside walls 132 and 134 of bait bins 136 and 138 respectively. Lock pins 140, as shown in FIG. 9, extend every 90° about the cover housing for engagement of four of eight lock slots 142 formed every 45° in a flange 144 about the base housing 122. When the cover housing 124 is rotated 45° from the position shown in FIG. 9, the openings 126 allow access over baffles 148 so that rodents can pass to the central passageway 150 underneath deflectors 156 and 158 similar to deflectors 56 and 58 for feeding through the gables 160 thereof. In FIG. 10, the normal cap closure 162 similar to cap 34 has been replaced by a large bait bottle 164 which screws in as a replacement. It should be noted that the bottle 164 has external threads 166 whereas the cap 34 was shown to have internal threads. Either is suitable provided the adjacent lip 46 or 168 is suitably oppositely threaded.

FIG. 11 illustrates a bait station 170 similar to bait station 20 except that one arm of the "H" configuration has been eliminated. Otherwise the portions as numbered thereof are identical to that of the bait station 20. The entry pathways are shown by the arrows 172. Another modified embodiment 180 of station 20 is shown in FIG. 12. In station 180, the rodent paths are shown by arrows 182. Since in station 182 there is a central bait bin 184 with suitable baffles 186 and 188, rodents must look across the bait bin 184 to see an exit even though they cannot use it because of the baffles 186 and 188. The central bait bin 184 is fed by a bait slide or by dual bait slides 190 and 192 on the opposite sides thereof so that as bait is eaten out of the central bait bin 184, additional bait stored on the slides becomes accessible to a rodent.

In the station 200, shown in FIG. 13, the bait bins 52 and 54 have been replaced by rodent traps 202 and 204. This allows essentially the same structure without the deflectors 56 and 58 to be used as an enclosed rodent trap. Once a rodent is killed by the trap 202 or 204, it is not accessible to children or pets. FIG. 14 shows a similar structure 210 where the internal bins with their baffles 78 and 80 have been removed allowing a more compact arrangement for placement of the traps 202 and 204.

Figure 15:
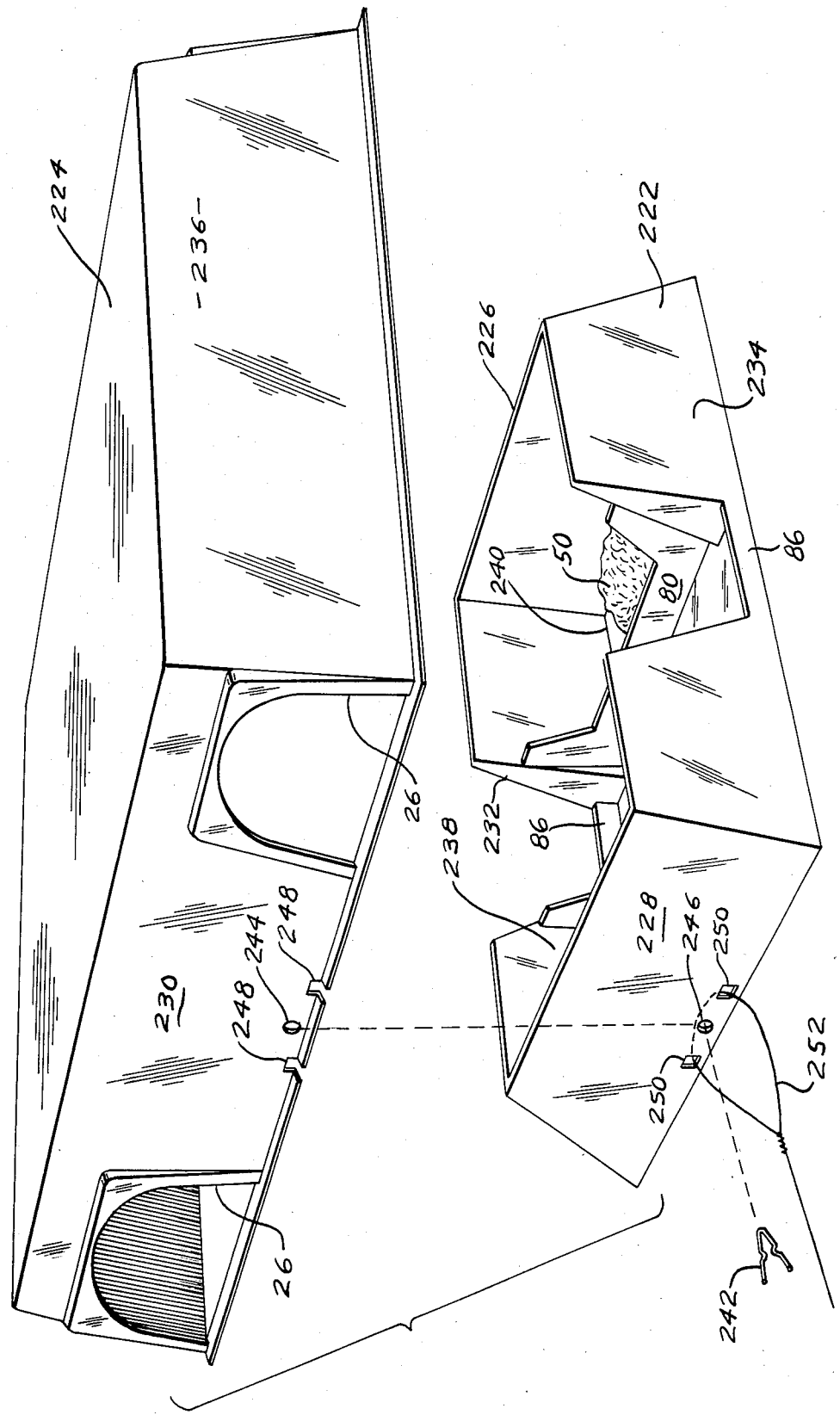
FIG. 15 is an exploded perspective view of a disposable bait prepackaged bait station similar to the station of FIGS. 1 through 7.

In FIG. 15 a two-piece bait station 220 is shown with a disposable feed bin structure 222. The station 202 includes a cover housing 224 which nests with the disposable feed bin 222. The back sides 226 and 228 of the disposable feed bin structure 222 extend to the side walls 230 of the housing 224 so that the opposite walls 232 and 234 of the bin structure 222 define with the opposite outer walls 136 of the cover housing 224, the arms of the "H" structure discussed above. Prepackaged bait 50 is provided in the bins 238 and 240 of the structure 222. Suitable means such as the security pin 242 and aligning holes 244 and 246 in the cover housing 224 and the structure 222 respectively are used to lock the two structures together. Notches 248 are provided in the cover housing 224 which align with holes 250 in the walls 228 so that tie anchors 252 can be threaded therethrough for anchoring the station 220 in the desired location.

Thus there has been shown and described novel bait stations which fulfill all of the objects and advantages sought therefore. Many changes, modifications, variations and other uses and applications of the subject invention will, however, become apparent to those skilled in the art after considering this Specification and the accompanying drawings. All such changes, modifications, alterations and other uses and applications which do not depart from the spirit and scope of the invention are deemed to be covered by the invention which is limited only by the claims which follow.

What is claimed is:

1. A station for killing rodents and other similar pests including:
a base housing having:
 a first chamber defined by:
  a front entrance;
  a back wall; and
  first and second sidewalls; and
a cover housing having:
 a first outer wall defining first and second openings therein, said cover housing and base housing being shaped to fit together to form an enclosure whose access and egress to said first chamber is provided by said defined first and second openings;
 a second outer wall defining third and fourth openings therein, said third and fourth openings being aligned with said first and second openings respectively;
 a third outer solid wall which extends from and runs generally at right angles to said first and second outer walls; and
 a fourth outer solid wall which extends from and runs generally at right angles to said first and second outer walls and runs generally parallel to said third outer wall; and said base housing further including:
a second chamber defined by:
 a front entrance;
 a back wall; and
 first and second sidewalls, said back walls of said first and second chambers nesting with said first and second outer walls between said openings defined therein to form an H shaped passageway with said first and second side walls of said first and second chambers, said front entrances of said first and second chambers each including:
  a baffle extending upwardly from said base housing, said first and second chambers each including:
   a deflector positioned over and spaced from said baffle to define a limited opening to said chamber, each deflector including:
    a central gable formed therein; and
    a pair of support members engaged with a deflector, and wherein said deflectors engage each other above and between said chambers.

2. The station as defined in claim 1 wherein each deflector includes:
 a upper edge; and
 a tab extending from said upper edge, whereby each of said tabs engage said upper edge of the other deflector to provide releasable connection therebetween.

3. The station as defined in claim 2 wherein said cover housing includes:
 a top wall with an opening defined therein; and
 a cover securely attachable to said top opening, whereby said top opening provides access to pour bait onto said deflectors for deflection into said first and second containers.

4. A station for killing rodents and other similar pests including:
a base housing having:
 a first chamber defined by:
  a front entrance;
  a back wall; and
  first and second sidewalls; and
a cover housing having:
 a first outer wall defining first and second openings therein, said cover housing and base housing being shaped to fit together to form an enclosure whose access and egress to said first chamber is provided by said defined first and second openings;
 a second outer wall defining third and fourth openings therein, said third and fourth openings being aligned with said first and second openings respectively;
 a third outer solid wall which extends from and runs generally at right angles to said first and second outer walls; and a fourth outer solid wall which extends from and runs generally at right angles to said first and second outer walls and runs generally parallel to said third outer wall; and said base housing further including:
a second chamber defined by:
  a front entrance;
  a back wall; and
  first and second sidewalls, said back walls of said first and second chambers nesting with said first and second outer walls between said openings defined therein to form an H shaped passageway with said first and second side walls of said first and second chambers, said base housing further including:
a pair of baffles extending between said sidewalls of said first and second chambers;
first, second, third, and fourth entrance baffles positioned adjacent said first, second, third, and fourth openings respectively, said first, second, third, and fourth entrance baffles extending toward but spaced from said third and fourth solid outer walls and said side walls of said first and second chambers; and
a floor surface canted away from said first and second chambers.

5. A station for killing rodents and other similar pests including:
a base housing having:
  a first chamber defined by:
    a front entrance;
    a back wall; and
    first and second sidewalls; and
a cover housing having:
  a first outer wall defining first and second openings therein, said cover housing and base housing being shaped to fit together to form an enclosure whose access and egress to said first chamber is provided by said defined first and second openings;
  a second outer wall generally parallel from said first outer wall;
  a third outer solid wall which extends from and runs generally at right angles to said first and second outer walls; and
  a fourth outer solid wall which extends from and runs generally at right angles to said first and second outer walls and runs generally parallel to said third outer wall; and said base housing having:
a second chamber defined by:
  a front entrance;
  a back wall; and
  first and second sidewalls, said back walls of said first and second chambers nesting with said third and fourth outer walls to form an T shaped passageway with said first and second side walls of said first and second chambers respectively, said front entrances of said first and second chambers each including:
    a baffle extending upwardly from said base housing;
    a deflector positioned over and spaced from said baffle to define a limited opening to said chamber, said deflectors engaging each other above and between said first and second chambers, each deflector including:
      a central gable formed therein;
      a upper edge; and
      a tab extending from said upper edge, whereby each of said tabs engage said upper edge of the other deflector to provide releasable connection therebetween; and
    a pair of support members engaged with a deflector.

6. The station as defined in claim 5 wherein said base housing further includes:
a baffle extending between said first and second sidewalls of said first and second chambers respectively;
first and second entrance baffles positioned adjacent said first and second openings respectively, said first and second entrance baffles extending towards but spaced from said first solid outer wall and said first and second side walls of said first and second chambers respectively; and
a floor surface canted away from said first and second chambers toward said first and second entrances.

7. A station for killing rodents and other similar pests including:
a base housing having:
  a first chamber defined by:
    a front entrance;
    a back wall; and
    first and second sidewalls; and
a cover housing having:
  a cylindrical outer wall defining first, second, third, and fourth openings therein, said third and fourth openings being aligned wtih said first and second openings respectively, said cover housing and base housing being shaped to fit together to form an enclosure whose access and egress to said first chamber is provided by said defined first and second openings, said base housing further having:
a second chamber defined by;
  a front entrance;
  a back wall; and
  first and second sidewalls, said back walls of said first and second chambers being cylindrical and nesting with said first outer wall; and
connection means which can engage said cover housing for connection at 45° rotation therebetween, opposite openings being blocked by said back walls when said base and cover housings are in a connected position and opened when said base and cover housings are in a 45° rotation connected position therefrom, said front entrances of said first and second chambers each including:
  a baffle extending upwardly from said base housing, said first and second chambers each further including:
    a deflector positioned over and spaced from said baffle to define a limited opening to said chamber, each deflector including:
      a central gable formed therein;
      a upper edge; and
      a tab extending from said upper edge, whereby each of said tabs engage said upper edge of the other deflector to provide releasable connection therebetween; and
    a pair of support members engaged with a deflector, and wherein said deflectors engage each other above and between said chambers.

* * * * *